(12) United States Patent
Wang (10) Patent No.: US 9,946,084 B2
(45) Date of Patent: Apr. 17, 2018

(54) METHODS FOR MAKING OPTICAL DEVICES

(71) Applicant: Corning Incorporated, Corning, NY (US)

(72) Inventor: Jue Wang, Fairport, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/228,245

(22) Filed: Aug. 4, 2016

(65) Prior Publication Data

US 2017/0045749 A1  Feb. 16, 2017

Related U.S. Application Data

(60) Provisional application No. 62/203,158, filed on Aug. 10, 2015.

(51) Int. Cl.
*G02B 27/14* (2006.01)
*G02B 1/18* (2015.01)
*C03C 27/06* (2006.01)

(52) U.S. Cl.
CPC ............ *G02B 27/149* (2013.01); *C03C 27/06* (2013.01); *G02B 1/18* (2015.01); *G02B 27/142* (2013.01)

(58) Field of Classification Search
CPC . G02B 1/105; G02B 1/14; G02B 1/02; G02B 1/10; G02B 27/144; G02B 27/283; G02B 27/286; G02B 5/04; G02B 5/208
USPC ................................. 359/629–640
See application file for complete search history.

(56) References Cited

U.S. PATENT DOCUMENTS

| 7,242,843 | B2 | 7/2007 | Clar |
| 7,683,650 | B1 | 3/2010 | Baker |
| 8,399,110 | B2 | 3/2013 | Cangemi |
| 2007/0003208 | A1 | 1/2007 | Clar et al. |
| 2009/0294050 | A1 | 12/2009 | Traggis et al. |

(Continued)

FOREIGN PATENT DOCUMENTS

| KR | 2012071960 A | 7/2012 |
| KR | 2012090020 A | 8/2012 |

(Continued)

OTHER PUBLICATIONS

International Search Report and Written Opinion PCT/US2016/045996 dated Oct. 21, 2016.

(Continued)

*Primary Examiner* — Mahidere Sahle
(74) *Attorney, Agent, or Firm* — Kevin L. Bray (57) ABSTRACT

Described herein are methods for constructing optical device without the need of chemical adhesives. The methods involve performing the following steps: obtaining a first optical substrate comprising a first surface and a second optical substrate comprising a second surface; applying water to the first surface of the first optical substrate, to the second surface of the second optical substrate, or both; securing the first optical substrate to the second optical substrate, wherein the first surface of the first optical substrate is adjacent to the second surface of the second optical substrate; and applying deep ultraviolet radiation to the first optical substrate and the second optical substrate to form a bond without the use of adhesive. Also provided are optical devices constructed by the methods described herein.

22 Claims, 10 Drawing Sheets

(56) References Cited

U.S. PATENT DOCUMENTS

| | | | |
|---|---|---|---|
| 2009/0294051 A1 | 12/2009 | Traggis et al. | |
| 2012/0194906 A1 | 8/2012 | Nicklaus | |
| 2012/0260719 A1 | 10/2012 | Schade | |
| 2013/0057123 A1 | 3/2013 | Song | |
| 2013/0155515 A1 | 6/2013 | Song | |
| 2013/0188254 A1 | 7/2013 | Li | |
| 2013/0279006 A1 | 10/2013 | Song | |
| 2014/0071519 A1 | 3/2014 | Chen | |
| 2017/0153361 A1* | 6/2017 | Mochizuki | G02B 1/08 |

FOREIGN PATENT DOCUMENTS

| | | | |
|---|---|---|---|
| KR | 2013027217 A | 3/2013 |
| KR | 2013119093 A | 10/2013 |
| KR | 1331469 B1 | 11/2013 |
| KR | 2014113582 A | 9/2014 |
| KR | 1450929 B1 | 10/2014 |

OTHER PUBLICATIONS

ThorLabs, https://www.thorlabs.com—downloaded Aug. 3, 2016.
Edmund Optics, http://www.edmundoptics.com/optics/beamsplitters/laser-line-beamsplitters—downloaded Aug. 3, 2016.
Chris Myatt, Nick Traggis, and Kathryn Li Dessau, "Optical contacting grows more robust," Laser Focus World, Jan. 1, 2006, pp. 1-6.

* cited by examiner

METHODS FOR MAKING OPTICAL DEVICES

This application claims the benefit of priority under 35 U.S.C. § 119 of U.S. Provisional Application Ser. No. 62/203,158 filed on Aug. 10, 2015 the content of which is relied upon and incorporated herein by reference in its entirety.

BACKGROUND

Laser line and broadband beamsplitters are in wide use in optical systems, with cube beamsplitters being more common. Cube beamsplitters are generally made from pairs of triangular glass prisms that have been bonded together. Bonding may be carried out using several different methods: optical adhesive bonding, optical direct bonding, and diffusion bonding.

With optical adhesive bonding, the thickness of the adhesive can be adjusted to reflect half the light of a given wavelength incident on one face of the cube and transmit the other half; however, this technique is not without drawbacks. Optical adhesive bonding bonds two polished mirror surfaces with optical adhesive such as, for example, polyester, epoxy, or urethane-based adhesive. Optical adhesive bonding is simple and can be used to bond different materials together; however, the presence of adhesive may lead to flaws or discolorations of the surface. Additionally, it is difficult to match the refractive index of the adhesive material to that of the optical components. Light from adhesive bonded devices loses flux through Fresnel reflection. Finally, the adhesive can be deformed, softened, or degraded when used in a laser system.

Optical direct bonding occurs when two ultrasmooth surfaces are held in close contact without any adhesive. It is thought that smooth surfaces in close enough contact will be electromagnetically attracted to one another. Under the right conditions, this type of bonding can be stronger than optical adhesive bonding. However, optical direct bonding is generally only suited to bonding between two prisms of the same material, since inconsistent expansion will occur due to differences in thermal expansion coefficients when the optical devices are heated (such as, for example, upon exposure to a laser). Inconsistent expansion can lead to separation of components and is particularly common in high-powered laser systems.

Meanwhile, high-temperature diffuse bonding is similar to optical direct bonding except that contact is followed by high-temperature heat treatment so that diffusion of atoms from one interface to the other can occur. However, as with optical direct bonding, high-temperature diffuse bonding is best suited to bonding crystal materials of the same type.

Cube beamsplitters currently on the market can split wavelengths of light down to about 250 nm. Challenges in the shorter wavelength regions include the lack of existence of absorption-free adhesives as well as the porous nature of fluoride coatings currently in use, especially for the ArF laser beam line at 193 nm. Chemical substances used as adhesives or during the bonding process can be absorbed by porous layers, leading to high absorption at short wavelengths. Due to these challenges, hybrid optical devices constructed from fused silicas such as HPFS® (Corning, Inc.) and $CaF_2$ are not currently available. However, such optical devices would be useful as ArF laser cube beamsplitters, as well as in other applications.

In the short wavelength region, standard optical bonding processes such as epoxy bonding, frit bonding, diffusion bonding, and optical contacting thus cannot be used due to absorption. One state-of-the-art bonding technology, chemically activated direct bonding (CADB), provides an epoxy-free solution assisted optical-contacting process. However, this process requires chemical soaking and thermal annealing, eliminating its applications for thermally sensitive crystal materials such as $CaF_2$.

Typically, excimer lasers of low wavelengths must be operated at power levels lower than their maximum or, alternatively, users of these lasers had to accept shorter device lifetimes while operating at lower power levels, due to degradation of beamsplitters. Uncoated $CaF_2$ surfaces, for example, degrade after only a few million pulses when subjected to pulse energies above 40 $mJ/cm^2$ using 193 nm excimer radiation. Although ArF excimer lasers typically operate at lower pulse energies, local non-uniformities in the beam may be higher than the average value and thus exceed the damage threshold.

What is needed is an absorption free bonding method for constructing optical devices such as beamsplitters. Ideally, this method could be used to construct optical devices exhibiting no scatter loss or absorption loss such as commonly seen with optical adhesive bonding and could be used with thermally sensitive materials and porous coatings. Further, devices constructed by this method would be more durable than currently available technology. The present invention addresses these needs.

SUMMARY

Described herein are methods for constructing optical device without the need of chemical adhesives. The methods involve performing the following steps: obtaining a first optical substrate comprising a first surface and a second optical substrate comprising a second surface; applying water to the first surface of the first optical substrate, to the second surface of the second optical substrate, or both; securing the first optical substrate to the second optical substrate, wherein the first surface of the first optical substrate is adjacent to the second surface of the second optical substrate; and applying deep ultraviolet radiation to the first optical substrate and the second optical substrate to form a bond without the use of adhesive. Also provided are optical devices constructed by the methods described herein.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Before the present methods and devices are disclosed and described, it is to be understood that the aspects described below are not limited to specific devices or methods, or uses as such may, of course, vary. It is also to be understood that the terminology used herein is for the purpose of describing particular aspects only and is not intended to be limiting.

It must be noted that, as used in the specification and the appended claims, the singular forms "a," "an," and "the" include plural referents unless the context clearly dictates otherwise. Thus, for example, reference to a coating includes two or more such coatings, and the like.

"Optional" or "optionally" means that the subsequently described event or circumstance can or cannot occur, and that the description includes instances where the event or circumstance occurs and instances where it does not. For example, the phrase "optionally includes an antireflective coating" means that an antireflective coating can or cannot be included.

As used herein, the term "about" provides flexibility to a numerical range endpoint by providing that a given value may be "a little above" or "a little below" the endpoint without affecting the desired result. Ranges may be expressed herein from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint and independently of the other endpoint.

Disclosed are materials and components that can be used for, can be used in conjunction with, can be used in preparation for, or are products of the disclosed compositions and methods. These and other materials are disclosed herein, and it is understood that when combinations, subsets, interactions, groups, etc. of these materials are disclosed that while specific reference of each various individual and collective combination and permutation of these compounds may not be explicitly disclosed, each is specifically contemplated and described herein. For example, if a material for making an optical device is disclosed and a discussed and a number of different compatible coatings are discussed, each and every combination and permutation of material for making an optical device and coating that is possible is specifically contemplated unless specifically indicated to the contrary. For example, if a class of molecules A, B, and C are disclosed as well as a class of molecules D, E, and F, and an example of a combination molecule, A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the subgroup of A-E, B-F, and C-E is specifically contemplated and should be considered disclosed from disclosure of A, B, and C; D, E, and F; and the example combination A-D. This concept applies to all aspects of this disclosure including, but not limited to, steps in methods of making and using the disclosed compositions. Thus, if a variety of additional steps can be performed, it is understood that each of these additional steps can be performed with any specific embodiment or combination of embodiments of the disclosed methods, and that each such combination is specifically contemplated and should be considered disclosed.

Described herein are methods for producing optical devices by bonding a first optical substrate having a first surface and a second optical substrate having a second surface to one another in the absence of a chemical adhesive. In one aspect, both the first optical substrate and the second optical substrate are made of the same material. In another aspect, the first optical substrate and second optical substrate are made of different materials. In one aspect, the first and/or second optical substrate is made of a material suitable for optical lithography. For example, a material suitable for optical lithography is a fused silica such as HPFS® (Corning, Inc.) or a metal fluoride. In a still further aspect, the first and/or second optical substrate can be constructed from an alkaline earth metal fluoride or a mixture of alkaline earth metal fluorides. In one aspect, the alkaline earth metal fluoride or mixture of alkaline earth metal fluorides can be $MgF_2$, $CaF_2$, $BaF_2$, $SrF_2$, $CaSrF_2$, or any combination thereof.

In one aspect, both the first optical substrate and second optical substrate are composed of $SiO_2$. In another aspect, both the first optical substrate and second optical substrate comprise $CaF_2$. In still another aspect, the first optical substrate comprises $SiO_2$ and the second optical substrate comprises $CaF_2$.

In another aspect, the first optical substrate and the second optical substrate are each triangular prisms used to produce a cube beamsplitter. Further in this aspect, the first surface and the second surface are the hypotenuse faces of the first optical substrate and the second optical substrate, respectively.

After the first and second optical substrates have been selected, water is applied to at least one surface of the first or second optical substrate. In one aspect, water is applied to the first surface of the first optical substrate. In another aspect, water is applied to both the first surface of the first optical substrate and the second surface of the second optical substrate. In one aspect, the water is deionized water.

The amount of water that is applied to the surface of the first and/or second optical substrate can vary depending upon the dimensions of the substrate surface and the desired thickness of the water layer between the two substrates. In one aspect, one or more drops of deionized water are applied to either the first surface or the second surface. A thin water layer forms when the two surfaces of the first and second optical substrate come into contact with one another.

Figure 1:
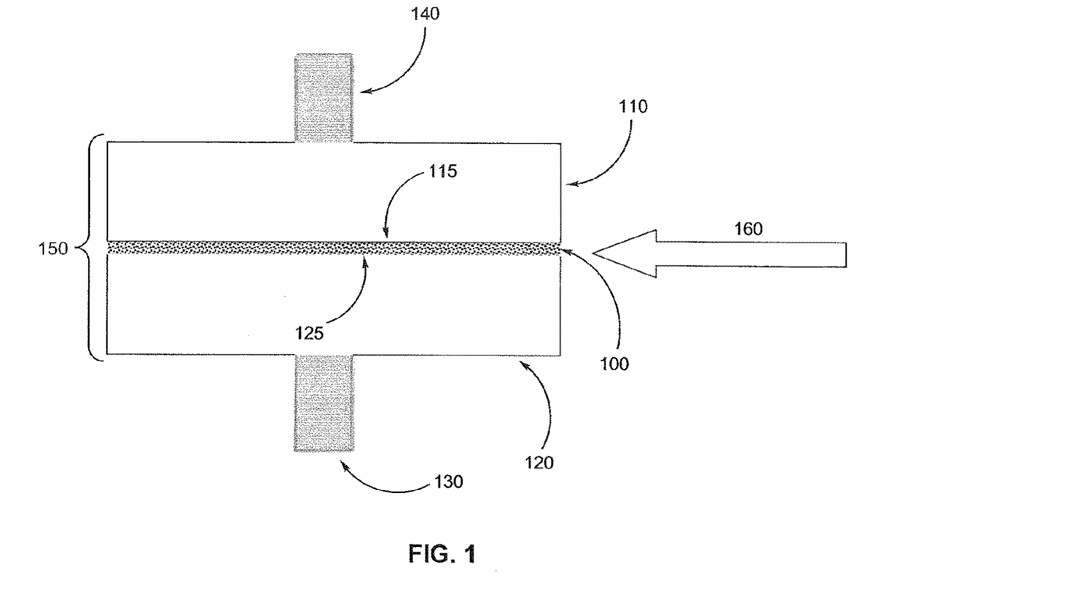
FIG. 1 shows a schematic illustration of the process described herein.

In one aspect, following the application of water to the surface of the first and/or second optical substrate, the first optical substrate can be secured to the second optical substrate in such a manner that a layer of water is evenly dispersed between the first and second optical substrate. FIG. 1 depicts one aspect of this embodiment. Referring to FIG. 1, a layer of water 100 is disposed between first optical substrate 110 and second optical substrate 120, where the water layer is in contact with the first surface 115 of the first optical substrate 110 and the second surface 125 of the second optical substrate 125. Securing devices 130 and 140 hold the first and second optical substrates 110 and 120 in place. The number of securing devices and the amount of pressure exerted by the device can vary. In one aspect, the securing device can be an adjustable clamp. In another aspect the securing device can be magnetic bars. The selection of the securing device should be such that the device does not scratch or damage the resulting optical device.

The first and/or second surfaces 115 and 125 of the first and second optical substrates 110 and 120 can be contacted with water for a time of from about 5 seconds to about 10 minutes at a temperature of from 20° to 30° C. In one aspect, the first and/or second surfaces can be contacted with water for about 5 seconds, about 10 seconds, about 30 seconds, about 1 minute, about 2 minutes, about 3 minutes, about 4 minutes, about 5 minutes, about 6 minutes, about 7 minutes, about 8 minutes, about 9 minutes, or about 10 minutes. In another aspect, the first and/or second surfaces are contacted with water at about 20°, about 21°, about 22°, about 23°, about 24°, about 25°, about 26°, about 27°, about 28°, about 29°, or about 30° C. In still another aspect, the first and/or second surfaces are contacted with water at room temperature, where no external heat from a heat source (e.g., an oven) is applied.

After the water layer 100 has been formed between first optical substrate 110 and second optical substrate 120 to produce the pre-optical device 150 (FIG. 1), the pre-optical device is exposed to deep ultraviolet (DUV) radiation as depicted as 160 in FIG. 1. In one aspect, the DUV radiation has energy of about 400 kJ/mol to about 800 kJ/mol. In aspect, the DUV radiation can have energy of about 400, about 450, about 475, about 500, about 550, about 600, about 650, about 700, about 750, or about 800 kJ/mol, where any value can form a lower or upper end-point of an energy range. In another aspect, the energy can be 647 kJ/mol or can be 472 kJ/mol.

In a further aspect, the DUV radiation source is a low-pressure mercury-vapor lamp. In this aspect, the lamp may emit radiation with two primary spectral lines at, for example, 184 nm and 253 nm. In an alternative aspect, the lamp can be constructed to emit radiation at only 184 nm or only 253 nm. In another aspect, the DUV radiation source is not a low-pressure mercury-vapor lamp but can be any other light source that emits a wavelength to which the optical substrates are transparent and that has photon energy high enough to dissociate the water molecules at the contacted interface.

The DUV radiation is applied to the pre-optical device 150 for a period of time from about 1 minute to about 30 minutes. Further in this aspect, the DUV radiation is applied to the first and second optical substrates for about 1, about 2, about 5, about 10, about 15, about 20, about 25, or about 30 minutes, where any value can form a lower or upper end-point of a time range. In yet another aspect, the time of DUV radiation exposure is dependent upon the amount of energy applied to the substrates. In one aspect, higher energy radiation requires a shorter DUV exposure time and lower energy radiation requires a longer DUV exposure time.

Not wishing to be bound by theory, it is believed that the DUV radiation can dissociate water present in the water layer 100 to generate hydroxyl radicals, which can subsequently react with the first and second optical surfaces 115 and 125 to produce new covalent bonds between the first and second surfaces of the first and second optical substrates. Additionally, it is believed that the hydroxyl radicals can be further dissociated by the DUV radiation to form oxygen bridges at the interface of the first and second optical substrates. In one aspect, the energy output of the mercury vapor lamp is able to dissociate bonds such as those found in common optical substrates and coatings. Table 1 shows the bond energies of $SiO_2$, $CaF_2$, and $H_2O$ related bonds.

TABLE 1

| Bond Energies | |
|---|---|
| Bond | Bond Energy (kJ/mol) |
| O—O | 139 |
| O=O | 498 |
| O—H | 428 |
| Si—H | 299 |
| Si—O | 780 |
| Si—Si | 327 |
| Ca—F | 527 |
| Ca—Ca | 46 |
| F—H | 563 |
| Ca—O | 402 |
| F—O | 222 |

Figure 2:
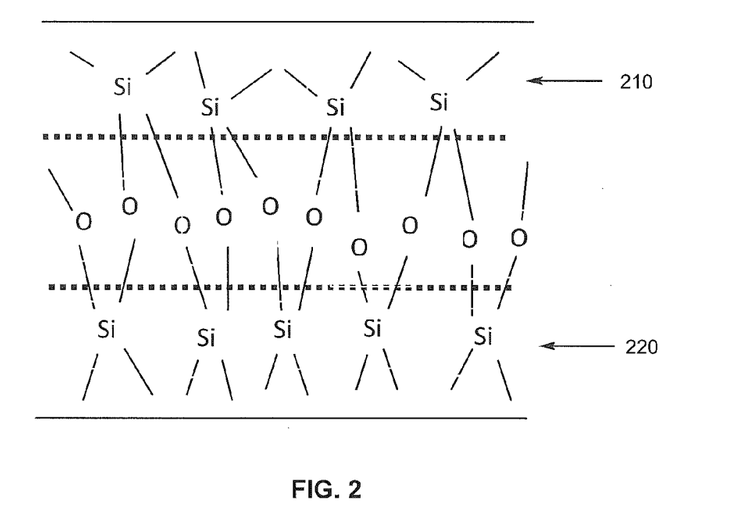
FIG. 2 shows a schematic illustration of chemical bonding at a $SiO_2$—$SiO_2$ interface.
Figure 3:
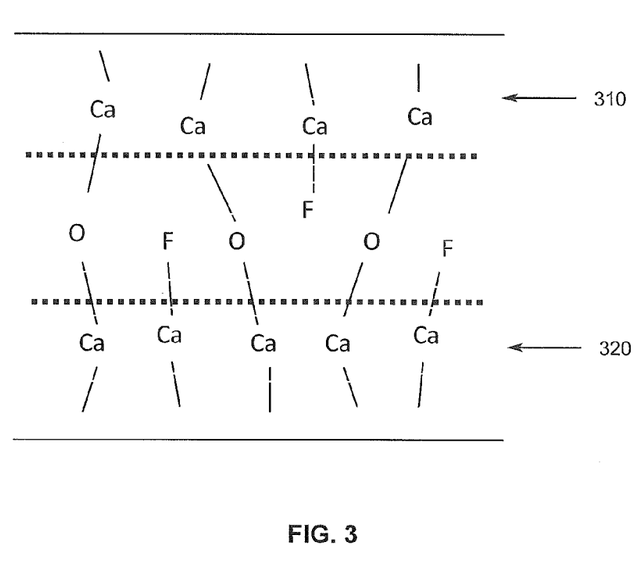
FIG. 3 shows a schematic illustration of chemical bonding at a $CaF_2$—$CaF_2$ interface.
Figure 4:
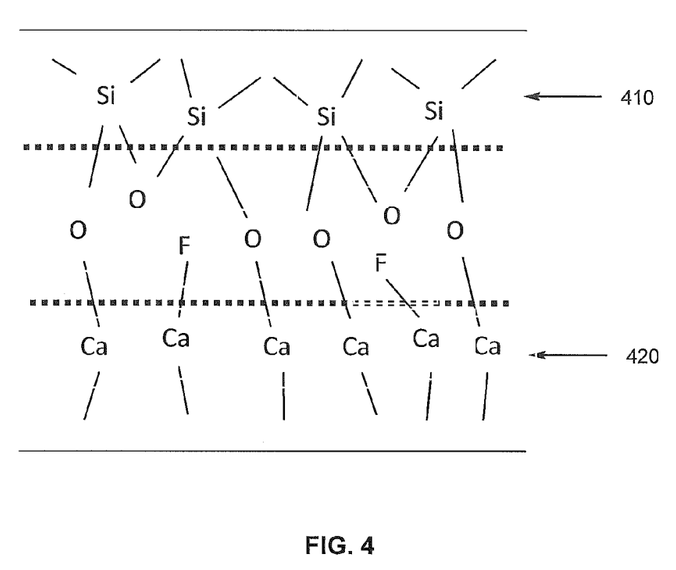
FIG. 4 shows a schematic illustration of chemical bonding at a $SiO_2$—$CaF_2$ interface.

FIGS. 2-4 shows the covalent bonding of $SiO_2$—$SiO_2$ optical substrates (FIG. 2), $CaF_2$—$CaF_2$ optical substrates (FIG. 3), and $SiO_2$—$CaF_2$ optical substrates (FIG. 4). Referring to FIG. 2, the $SiO_2$—$SiO_2$ optical substrates 210 and 220 are covalently bonded to one another via —Si—O—Si— bonds. In the case of $CaF_2$—$CaF_2$ optical substrates 310 and 320 in FIG. 3, the optical substrates are covalently bonded to one another via —Ca—O—Ca— bonds. Finally, the $SiO_2$—$CaF_2$ optical substrates 410 and 420 are bonded to one another via —Si—O—Ca— bonds (FIG. 4).

In still another aspect, the optical device constructed by any of the above methods is not annealed or heated subsequent to the application of DUV radiation. Thus, the methods described herein are useful in adhering optical substrates composed of different material (e.g., first substrate is $SiO_2$ and the second substrate $CaF_2$). In one aspect, the first substrate is uncoated fused silica such as HPFS® (Corning, Inc.) and the second substrate is $CaF_2$. Moreover, the methods described herein do not require the use of chemical adhesives, which has several disadvantages as discussed above.

Figure 5:
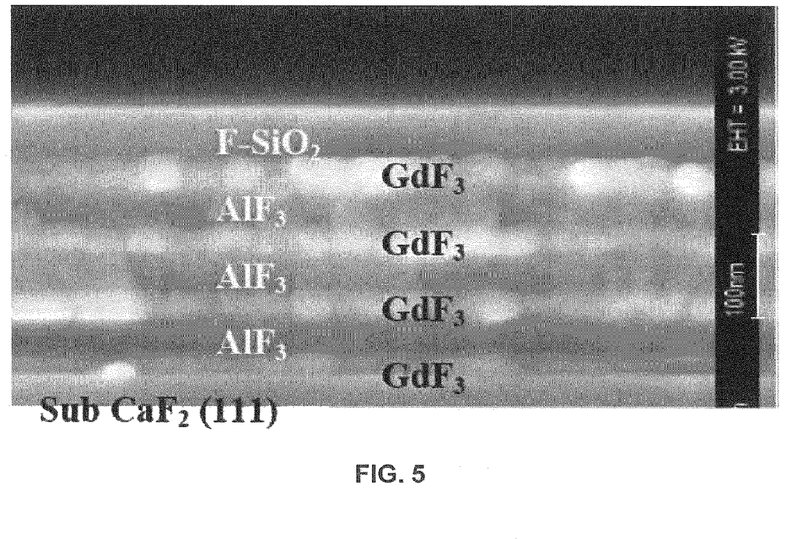
FIG. 5 shows a scanning electron micrograph (SEM) of a cross section of an F—$SiO_2$ sealed coating stack ($GdF_3$/$AlF_3$) on a $CaF_2$ surface.

In a further aspect, one or more surfaces of the optical device produced by the methods described herein can be coated with one or more coatings known in the art. In one aspect, the coating can be a beamsplitter coating, an anti-reflective coating, a mirror coating, a partial mirror coating, a polarization control coating, or a combination thereof. In one aspect, the coating is a metal fluoride material. In a further aspect, the metal fluoride material can be $AlF_3$, $NaF$, $MgF_2$, $LaF_3$, $GdF_3$, $NdF_3$, or a combination thereof. In yet another aspect, multiple metal fluoride coatings are layered on top of one another. In this aspect, 2 layers, 3 layers, 4 layers, 5 layers, 6 layers, 7 layers, 8 layers, 9 layers, or 10 layers of metal fluoride coatings are applied to the devices. In another aspect, the layers may be made from different metal fluorides, the same metal fluorides, or alternating metal fluorides. In one aspect, there are seven metal fluoride coating layers consisting of alternating films of $GdF_3$ and $AlF_3$. FIG. 5 provides an example of this where a surface of an optical device produced herein composed of $CaF_2$ has alternating layers of $AlF_3$ and $GdF_3$.

In yet another aspect, after the application of DUV radiation, at least one exposed surface of the optical device can be hermetically sealed. The methods disclosed in U.S. Pat. Nos. 7,242,843 and 8,399,110 can be used herein to hermetically seal the optical devices produced herein. In some aspects, hermetic sealing of the optical device prevents degradation of the optical device from deionized water in immersed lithographic applications. The hermetic seal may be physically or chemically (i.e., covalently) bonded to the underlying surface. In one aspect, the hermetic sealing material is selected from an oxide or fluorinated oxide film. For example, the device can be hermetically sealed with $Al_2O_3$, $F:Al_2O_3$, $SiO_2$, $SiON$, $HfO_2$, $Si_3N_4$, $ZrO_2$, $TiO_2$, $SiO_2/ZrO_2$, $F:SiO_2/ZrO_2$, $F:SiO_2$, or any combination thereof.

In one aspect, the hermetic sealing layer is placed atop and around a coating layer present on the optical device. For example, an anti-reflective coating can be applied to the surface of the optical device followed by hermetically sealing the anti-reflective coating. In one aspect, one or more coating layers can be hermetically sealed on the optical device. An example of this is provided in FIG. 5, where a plurality of coatings composed of metal fluorides is hermetically sealed by $F:SiO_2$.

In another aspect, when no coating is applied to the surface of the optical device, the device or a surface thereof can be hermetically sealed directly.

In one aspect, the methods described herein are useful in producing beamsplitters. A "beamsplitter" is an optical device that splits a beam of light in two. In one aspect, cube and laser line beamsplitters can be produced herein. In another aspect, the beamsplitters can be film polarizing beamsplitters, non-polarizing beamsplitters, long and short wavelength cut-off filters, or bandpass filters.

In one aspect, the optical devices described herein possess numerous advantages over current optical devices. For example, the optical devices produced herein are used in excimer lasers that operate at wavelengths 248 nm, 193 nm, or 157 nm for optical lithography, medical, or industrial applications. In another aspect, the optical devices require fewer materials to construct because they do not require adhesive but instead only require a small amount of deionized water. In another aspect, the optical devices involve a lower production cost because they can be constructed with existing coating and cleaning equipment and because they do not require high temperature annealing or thermal curing for the bonding process. In a still further aspect, the optical devices described herein are durable and degradation is not expected for the photo-activated, water-initiated chemical bonds since they are absorption free.

EXAMPLES

The following examples are put forth so as to provide those of ordinary skill in the art with a complete disclosure and description of how the compounds, compositions, and methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Procedure for Constructing Optical Devices

Two optical surfaces were cleaned and put into optical contact with a thin layer of deionized water at the interface between them. The optical surface flatness was lower than 0.2 fringes at 635 nm and the surface roughness was less than 0.2 nm for bare substrates. DUV light from a low-pressure mercury vapor lamp was used to ionize and volatilize the interfacial water, activating chemical bonding of the surfaces. The two surfaces were held together for 10 min at room temperature, for experimental purposes, using a pair of magnetic bars during which time they were irradiated. However, a mechanical holder can also be used. The mercury vapor lamp used in these experiments emitted two main spectral lines at 184 nm and 253 nm, corresponding to 647 kJ/mol and 472 kJ/mol, respectively. This procedure can also be carried out in vacuum.

Figure 6:
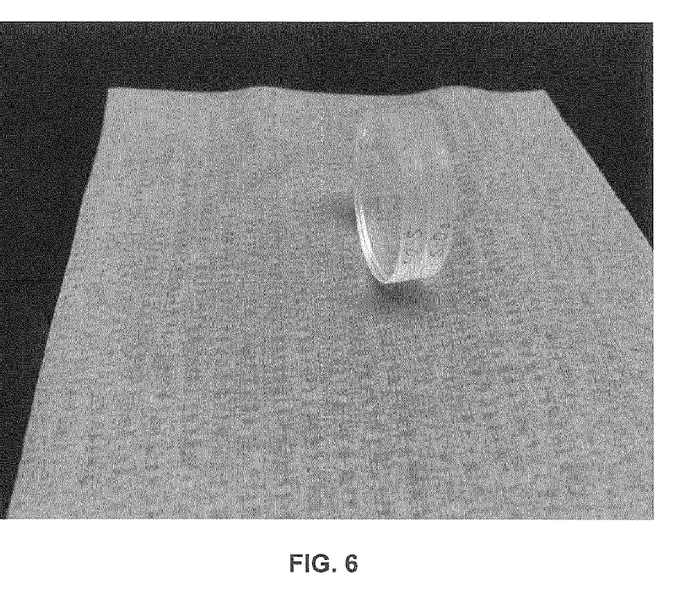
FIG. 6 shows a photograph demonstrating the chemical bonding of two $SiO_2$ substrates using the process described herein.
Figure 7:
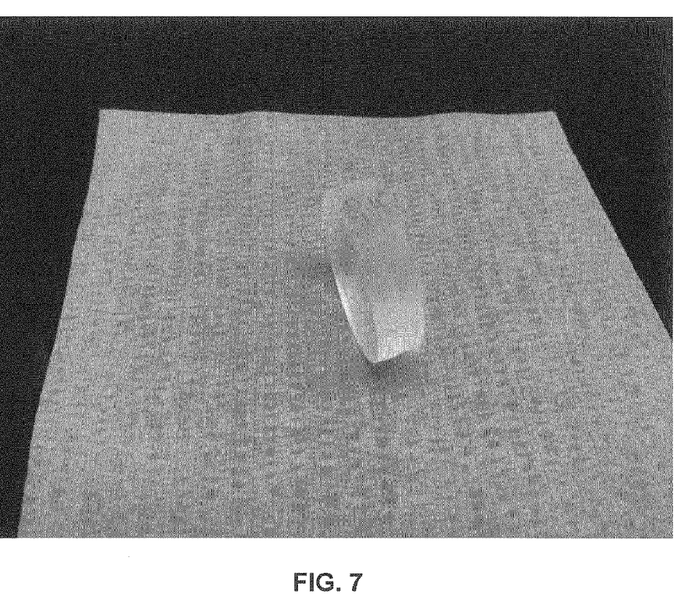
FIG. 7 shows a photograph demonstrating the chemical bonding of two $CaF_2$ substrates using the process described herein.

Following construction of the optical device, a porous fluoride coating was sealed and smoothed by a dense and smooth $F:SiO_2$ capping layer using modified plasma ion-assisted deposition in order to provide hermetic sealing and enable direct chemical bonding between the $F:SiO_2$ layer and coated or uncoated $CaF_2$ or $SiO_2$ surfaces. Example devices constructed from (1) two $SiO_2$ substrates (FIG. 6), (2) two $CaF_2$ substrates (FIG. 7), and (3) one $SiO_2$ substrate bonded to a $CaF_2$ substrate were constructed.

A finished $CaF_2$ device was coated with alternating layers of $GdF_3$ (four layers) and $AlF_3$ (three layers) and hermetically sealed with $F:SiO_2$. A SEM cross-sectional image of this optical device is shown in FIG. 5.

Performance of Optical Devices

Figure 8:
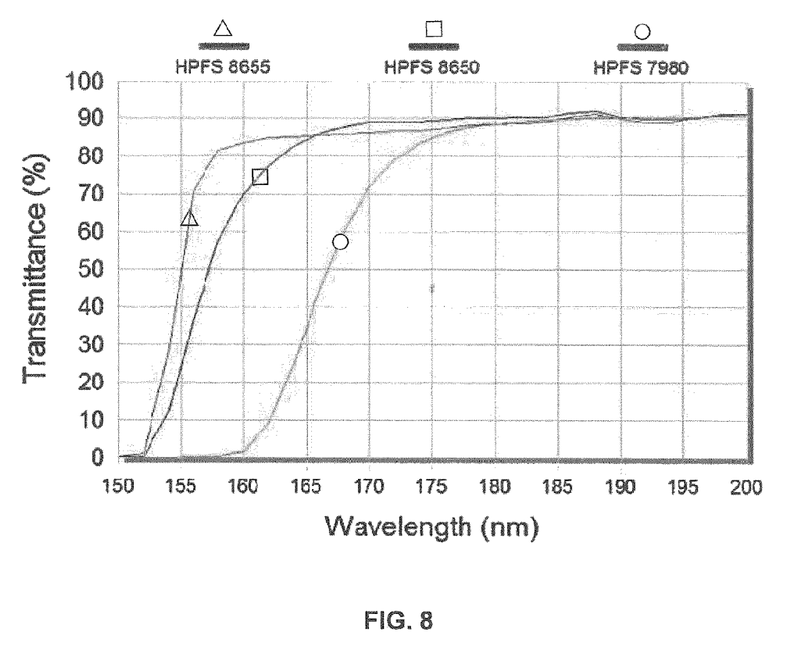
FIG. 8 shows VUV and DUV spectral transmittances of commercial fused silicas HPFS® 8655, 8650, and 7980 (Corning, Inc.) with thicknesses of 3.3 mm, 3.1 mm, and 3.3 mm, respectively.

FIG. 8 shows VUV and DUV spectral transmittance of HPFS® (Corning, Inc.) 8655, 8650, and 7980 glasses with thicknesses of 3.3 mm, 3.1 mm, and 3.3 mm, respectively. All samples of HPFS tested were transparent to the mercury vapor lamp emission. This demonstrated that two HPFS surfaces contacting one another with an intermediate water layer could be chemically bonded using DUV irradiation at 184 nm and 253 nm.

Figure 9A:
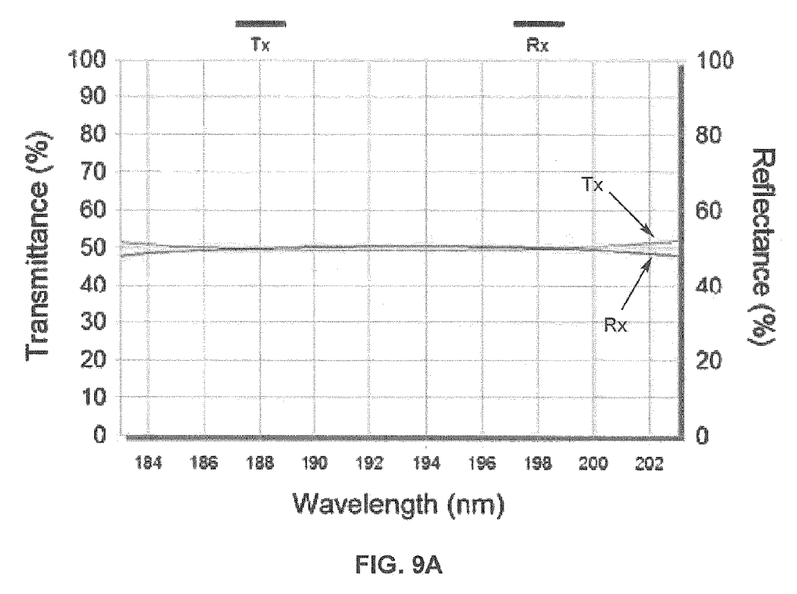
FIGS. 9A and 9B show, respectively, transmittance and reflectance spectra of $CaF_2$ and $SiO_2$ based on a 50%:50% unpolarized cube beamsplitter at 193 nm.
Figure 9B:
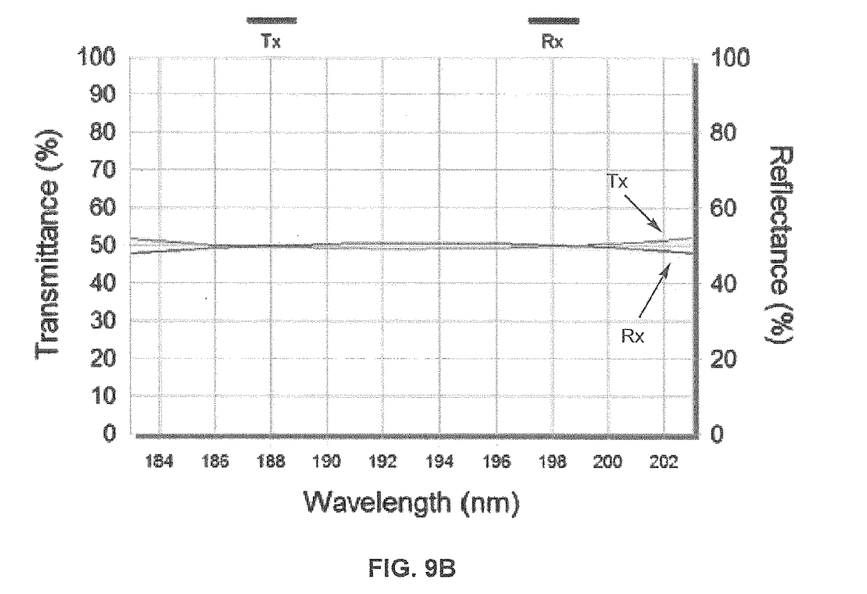

FIGS. 9A and 9B show, respectively, transmittance and reflectance spectra of a $CaF_2$ and $SiO_2$ based unpolarized cube beam splitter at 193 nm.

Throughout this application, various publications are referenced. The disclosures of these publications in their entireties are hereby incorporated by reference into this application in order to more fully describe the methods and articles described herein.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

What is claimed is:

1. A method for producing an optical device comprising:
   (a) obtaining a first optical substrate comprising a first surface and a second optical substrate comprising a second surface;
   (b) applying water to the first surface of the first optical substrate, to the second surface of the second optical substrate, or both the first surface of the first optical substrate and the second surface of the second optical substrate;
   (c) securing the first optical substrate to the second optical substrate, wherein a layer of water is dispersed between the first surface of the first optical substrate and the second surface of the second optical substrate; and
   (d) applying deep ultraviolet radiation to the first optical substrate and the second optical substrate, the deep ultraviolet radiation dissociating water in the layer of water to form hydroxyl radicals.

2. The method of claim 1, wherein the first optical substrate and the second optical substrate are made of the same material.

3. The method of claim 1, wherein the first optical substrate and the second optical substrate are made of different materials.

4. The method of claim 1, wherein the first optical substrate and the second optical substrate comprise $SiO_2$.

5. The method of claim 1, wherein the first optical substrate and the second optical substrate comprise $CaF_2$.

6. The method of claim 1, wherein the first optical substrate comprises $SiO_2$ and the second optical substrate comprises $CaF_2$.

7. The method of claim 1, wherein the first optical substrate and the second optical substrate are each a triangular prism, wherein the first surface and the second surface are the hypotenuse face of the first optical substrate and the second optical substrate.

8. The method of claim 1, wherein the optical device is a cube beamsplitter.

9. The method of claim 1, wherein the optical device is a film polarizing beamsplitter, a non-polarizing beamsplitter, a long and short wavelength cut-off filter, or a bandpass filter.

10. The method of claim 1, wherein the water is deionized.

11. The method of claim 1, wherein the first optical substrate and the second optical substrate are contacted with water from 5 seconds to 10 minutes at a temperature from 20° C. to 30° C.

12. The method of claim 1, wherein the deep ultraviolet radiation is from 400 kJ/mol to 800 kJ/mol.

13. The method of claim 1, wherein the deep ultraviolet radiation is applied to the first optical substrate and the second optical substrate from 1 minute to 30 minutes.

14. The method of claim 1, wherein after step (d), the optical device is not subsequently annealed or heated.

15. The method of claim 1, further comprising after step (d), hermetically sealing at least one exposed surface of the optical device.

16. The method of claim 15, further comprising after step (d), hermetically sealing the optical device with $Al_2O_3$, $SiO_2$, or $F-SiO_2$.

17. The method of claim 1, further comprising after step (d), applying one or more coatings on at least one exposed surface of the optical device, wherein the coating comprises an anti-reflective coating, a reflective or partially reflective mirror coating, a polarization coating, or a beamsplitter coating.

18. The method of claim 17, further comprising after applying one or more coatings on at least one exposed surface of the optical device, hermetically sealing the one or more coatings.

19. An optical device produced by the method in claim 1.

20. The method of claim 1, wherein the hydroxyl radicals react with the first surface or the second surface, the reaction producing covalent bonds between the first surface and the second surface.

21. The method of claim 1, wherein the deep ultraviolet radiation further dissociates the hydroxyl radicals.

22. The method of claim 1, wherein the deep ultraviolet radiation further forms oxygen bridges at an interface of the first surface and the second surface.

* * * * *